No. 791,999. PATENTED JUNE 13, 1905.
H. A. BALLARD & W. A. COPELAND.
MACHINE FOR AUTOMATICALLY IRONING SHOES.
APPLICATION FILED APR. 3, 1902.

No. 791,999. PATENTED JUNE 13, 1905.
H. A. BALLARD & W. A. COPELAND.
MACHINE FOR AUTOMATICALLY IRONING SHOES.
APPLICATION FILED APR. 3, 1902.

No. 791,999. PATENTED JUNE 13, 1905.
H. A. BALLARD & W. A. COPELAND.
MACHINE FOR AUTOMATICALLY IRONING SHOES.
APPLICATION FILED APR. 3, 1902.

Witnesses:
Inventors:

No. 791,999. PATENTED JUNE 13, 1905.
H. A. BALLARD & W. A. COPELAND.
MACHINE FOR AUTOMATICALLY IRONING SHOES.
APPLICATION FILED APR. 3, 1902.

Witnesses.
Edwin T. Lyne
Walter E. Lombard

Inventors:
H. A. Ballard
W. A. Copeland
by Wright Brown & Quinby
their Attys.

No. 791,999. PATENTED JUNE 13, 1905.
H. A. BALLARD & W. A. COPELAND.
MACHINE FOR AUTOMATICALLY IRONING SHOES.
APPLICATION FILED APR. 3, 1902.

Witnesses:
Edwin P. Luce
Walter E. Lombard

Inventors:
H. A. Ballard
W. A. Copeland
by Wright Brown Quinby
their Attys.

No. 791,999.

Patented June 13, 1905.

UNITED STATES PATENT OFFICE.

HARRIE A. BALLARD, OF ASHLAND, AND WILLIAM A. COPELAND, OF MELROSE, MASSACHUSETTS, ASSIGNORS, BY MESNE ASSIGNMENTS, TO THE BOYLSTON MANUFACTURING COMPANY, OF BOSTON, MASSACHUSETTS, A CORPORATION OF NEW JERSEY.

MACHINE FOR AUTOMATICALLY IRONING SHOES.

SPECIFICATION forming part of Letters Patent No. 791,999, dated June 13, 1905.

Application filed April 3, 1902. Serial No. 101,251.

*To all whom it may concern:*

Be it known that we, HARRIE A. BALLARD, of Ashland, and WILLIAM A. COPELAND, of Melrose, in the county of Middlesex and State of Massachusetts, have invented certain new and useful Improvements in Machines for Automatically Ironing Shoes, of which the following is a specification.

In order to properly prepare boots and shoes, or at least certain classes or grades, for use it is essential or desirable to put them through an operation known as "ironing." In this operation the shoe is placed upon a tree, and an operator, employing a heated iron, the handles of which he grasps with both hands, rubs and polishes the upper of the shoe. This operation has always been accomplished manually, and it necessarily has added greatly to the cost of the shoe by reason of the length of time it takes to properly iron the shoe and the cost of the labor.

This invention has for its object primarily the provision of a machine for automatically accomplishing the ironing operation.

On the accompanying drawings, Fig. 2 represents a front elevation of the ironing-machine. Fig. 4 represents a section on the line 4 4 of Fig. 1. Fig. 4ª represents a vertical transverse section through the lower head.

Referring to the drawings, $a$ indicates the standard of a treeing-stand, mounted upon a base $a'$. Said stand is provided with a plurality of trees $a^2$, of which but one is shown. The tree is so constructed that a shoe may be placed thereon and expanded and then swung into operative relation to the ironing-machine. The exact construction of the treeing-stand—the turret $a^3$, to which the trees are connected, the means by which each tree is expanded, and the mechanism for locking and unlocking the turret—is practically immaterial, so far as the broad features of the invention are concerned. Each tree as it swings to operative position serves as a work-support during the ironing operation.

The ironing-machine, whose framework $b$ is erected from the base $a'$, is provided with two movable heads or tool-carriers, (indicated at $c$ and $d$, respectively.) These two heads are so operated that the one at $c$ is first started and by its initial stroke releases the carrier $d$, after which the two carriers move in unison until they have made the desired number of strokes, at which time the carrier or head $d$ comes to a stop, and the other carrier moves away from it to its lower extreme of movement and stops.

The lower head or carrier $c$ is reciprocated by the lever 3, whose fulcrum 4 is between two springs 5 5, which act against the thrust of a pitman-rod 6, which is reciprocated by an eccentric 7. One end of the lever 3 is connected to the carrier $c$ by a link 8.

Figure 3:
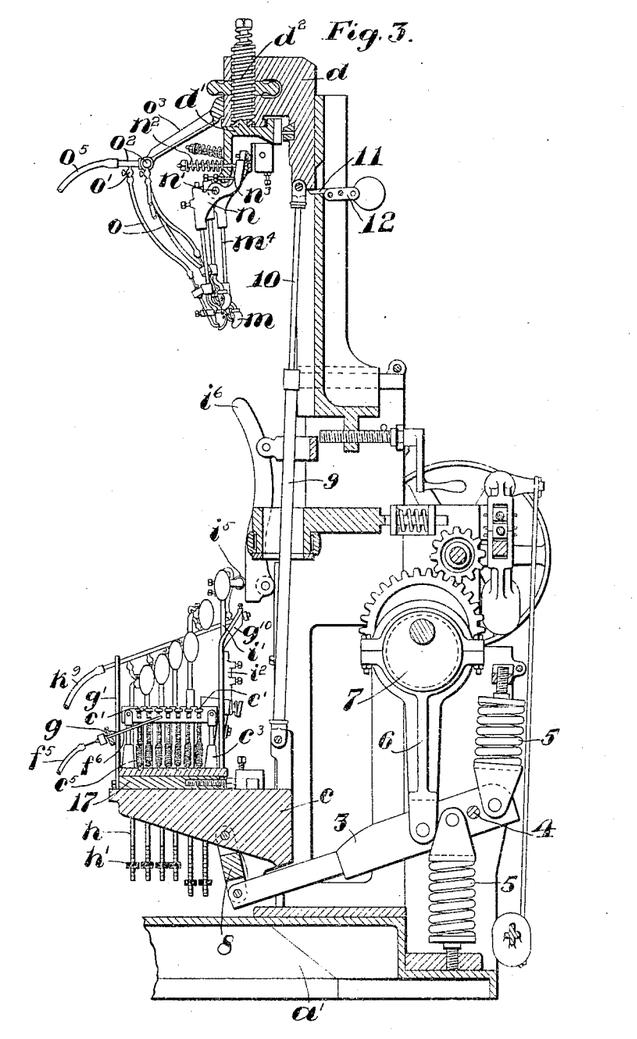
Fig. 3 represents a longitudinal section through the ironing-machine.

During the initial stroke of the carrier $c$ a sleeve 9, connected to said carrier, engages a shoulder on a rod 10, connected to the carrier $d$, (said rod and sleeve telescoping, as shown,) and the carrier $d$ is lifted slightly out of engagement with the pawl 11, by which it was supported, whereby the pawl falls back out of the path of the carrier $d$, thus freeing it and permitting the two carriers to reciprocate together as one until the pawl is returned to place to prevent further movement of the carrier $d$ with the carrier $c$ When the carriers are about to complete their last stroke together as one, the holder 12 of the pawl 11 is returned to position, as shown in Fig. 3, and the subsequent upward movement of the carrier $d$ swings the pawl 11 upwardly far enough to clear the end of it, when the pawl drops into the path of the carrier $d$ and arrests its downward movement, the carrier $c$ completes its stroke, and the machine is automatically stopped.

The pawl-holder 12 is actuated by a lever 13, controlled by a time-wheel B and a connecting-rod 14.

After the machine is started it completes a cycle of operation before it automatically stops. To start the machine, there is a foot-treadle 27 on a rock-shaft 28. This shaft is connected with the clutch mechanism (not shown) which coöperates with the stop mechanism.

On the carrier $c$ is a tool-block 17, movable in and out step by step while the machine is traversing its cycle. This step-by-step movement is accomplished by any suitable mechanism, such as illustrated in the patent to Harrie A. Ballard, No. 691,576, dated January 21, 1902. By this means the tools carried by the block 17 are shifted on the carrier $c$ with relation to a shoe on the tree $a^2$ for the purpose of causing them to properly act upon the shoe. On this block 17 are mounted the tools for operating on the back and the sides of the shoe, as will be explained in detail.

On the carrier $d$ is mounted a tool-holder $d'$, which is swiveled in an adjustable support $d^2$. By suitable provisions, such as set forth in the Ballard patent, No. 691,576, the tool-holder is partially rotated with a step-by-step movement, first in one direction and then in the other direction, this movement occurring when the tools to be described are out of engagement with the shoe, whereby the tools are caused to properly engage and iron the toe end of the shoe, as will be explained. The precise details of construction of the machine may be greatly varied, it being simply essential to provide two operative heads or tool-carriers with provisions whereby the tools are caused to automatically engage, treat, and iron the shoe. The carriers are far enough apart to permit the free movement of a tree and the treeing-stand into and out of operation. The shoes are applied to the trees from one side of the machine and removed therefrom on the other or same side of the machine after the turret $a^3$ has been turned to swing the shoe into position to be operated upon by the tools.

To the base $a'$ of the machine is pivotally mounted a foot-lever 114, which controls the mechanism by means of which the trees are expanded to stretch the shoe, and for the purpose of effecting the unlocking of the turret and permitting the rotation thereof there is provided a foot-lever 118 adjacent to that at 114. These mechanisms may be substantially similar to those set forth in the Letters Patent last referred to.

The tools which operate upon the shoe will now be described.

At $c'$ is shown a series of tools for operating upon the back of the shoe. Each tool consists of a chain having wipers or ribs adapted to bear against and rub the shoe. Each chain is secured at one end to a bar $c^2$, attached to the standards $c^3$. The chains pass loosely over a notched bar $c^4$, and each is attached to a spring $c^5$, secured at its lower end to the block 17. The provision of the springs permits the tools $c'$ to yield when they engage the back of the shoe and to effect the rubbing and ironing of the shoe.

Figure 1:
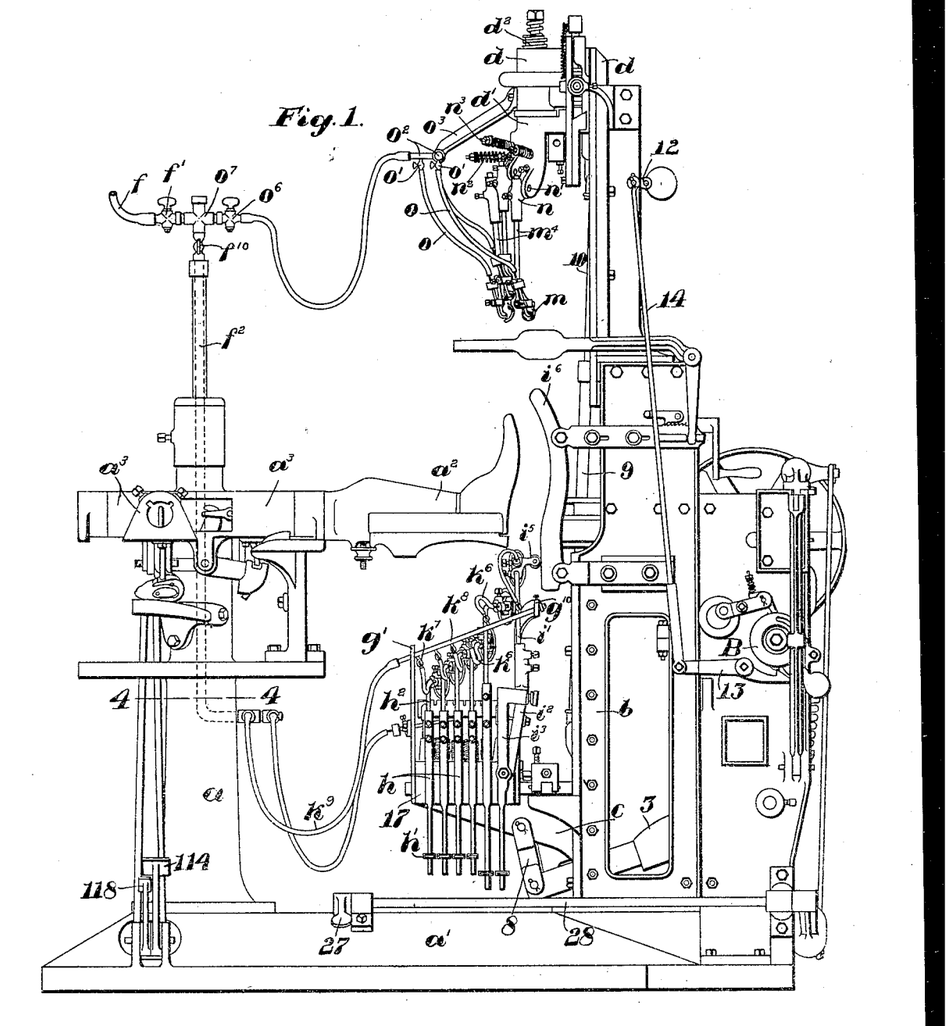
Figure 1 represents one embodiment of the invention, this figure illustrating a treeing-stand and the ironing-machine in side elevation.
Figures 2, 4, 4A:
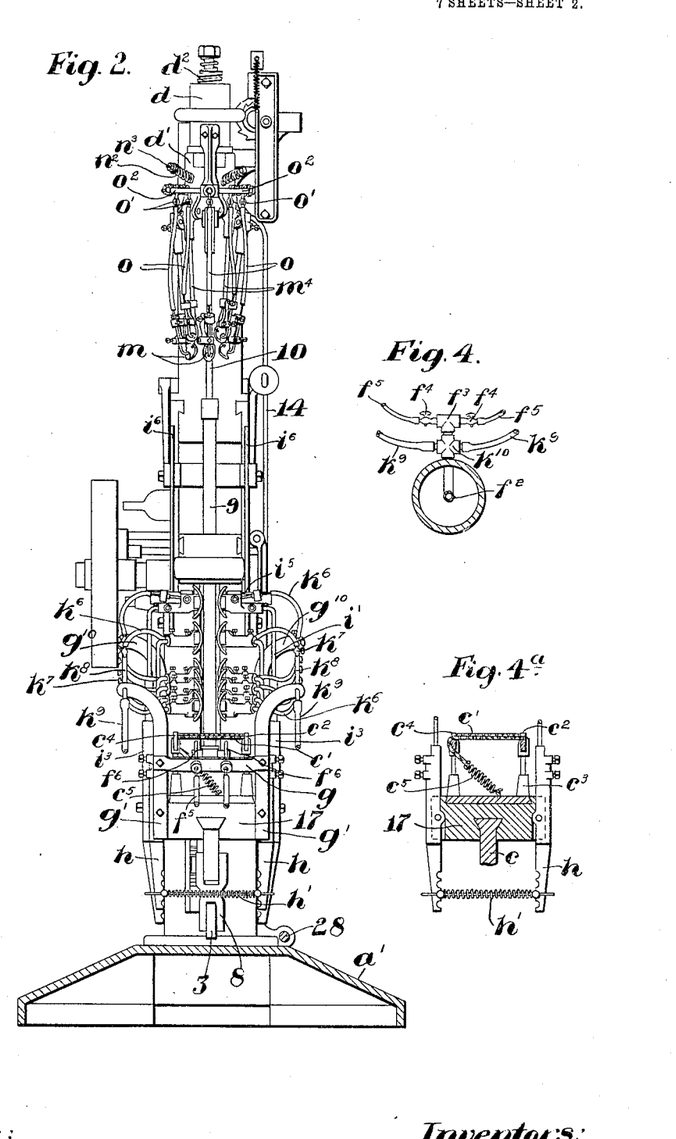

The heating medium which is employed in this machine, but which may be varied as circumstances require, consists of gas, which is supplied from a main pipe $f$, equipped with a valve $f''$. This pipe is connected with a pipe $f^2$, passed down through the center of the treeing-stand. The said pipe is bent to project through the stand, as shown in Figs. 1 and 4. At the end of the pipe $f^2$ there is a coupling $f^3$, provided with two valves $f^4$ $f^4$, and from the nozzles of said valves flexible tubes or conduits $f^5$ extend to two burners $f^6$ $f^6$, arranged below the tools at $c'$, so as to direct the flames under said tools. The nozzles of the burners are secured to a cross-bar $g$, attached to standards $g'$ $g'$, secured to the ends of the block 17. Each burner is of the Bunsen type, whereby a proper supply of oxygen is mixed with the gas to produce a blue flame of intense heat. Any number of burners may be employed for heating the said tools to such an extent as to properly iron the back of the shoe without danger of burning it. The size of the flame may be regulated by the valves at $f^4$.

Figure 5:
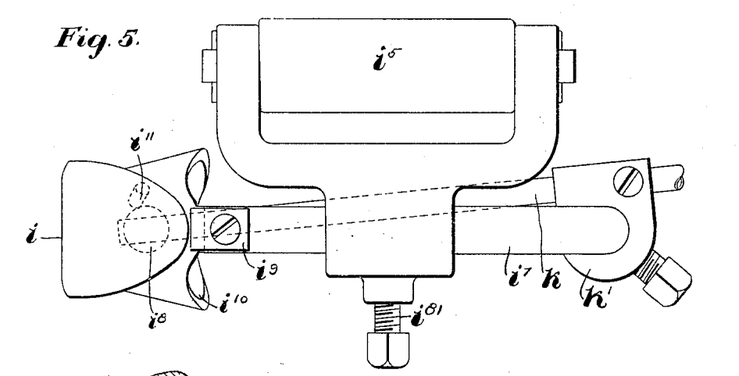
Figs. 5 and 6 represent one form of ring or shank tool which is mounted upon the lower head.
Figure 6:
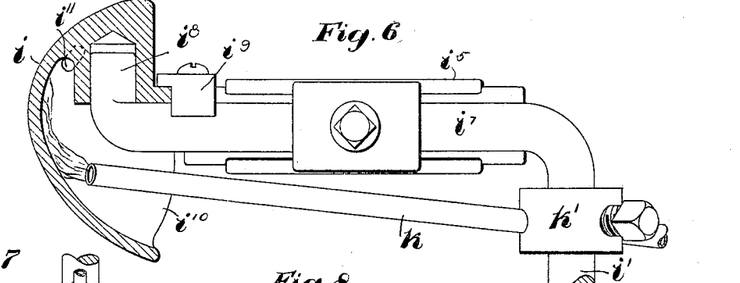
Figure 10:
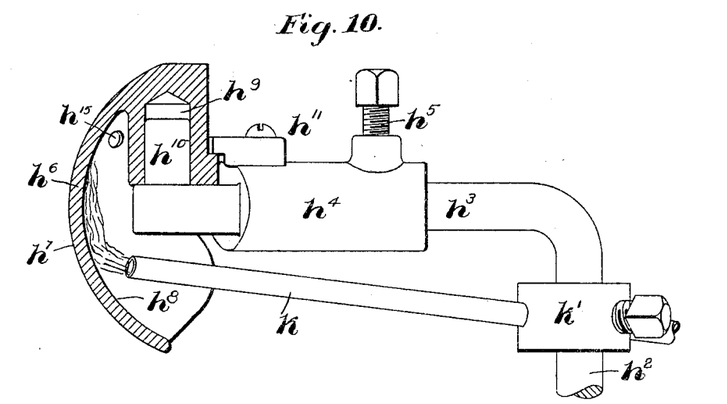
Figs. 10, 11, and 12 illustrate other forms and also side tools in which the tool swings upon a single vertical stud.
Figure 11:
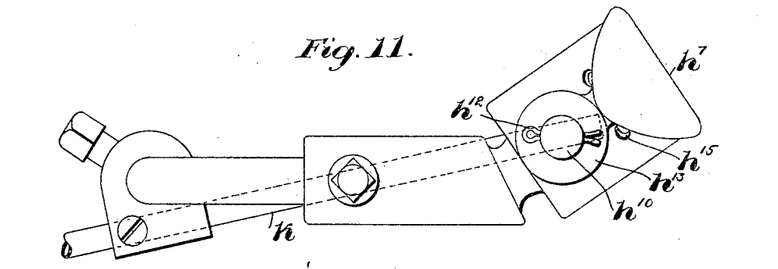
Figure 12:
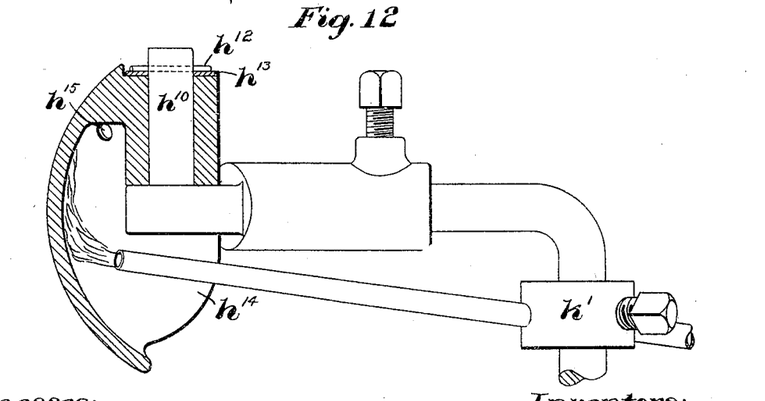
Figure 13:
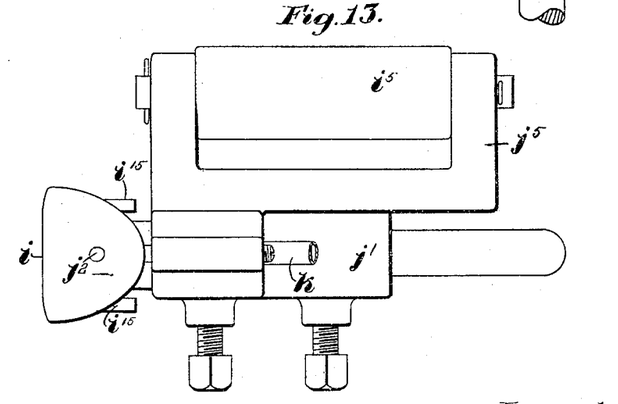
Figs. 13, 14, 15, 16, and 17 represent still another form of lower side tool which may be employed on the machine.
Figure 14:
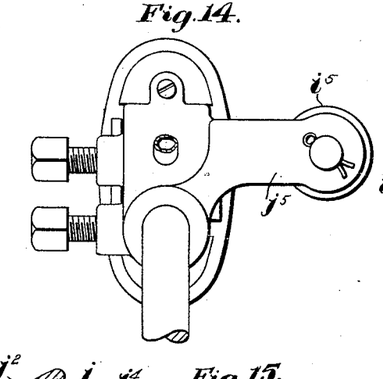
Figure 15:
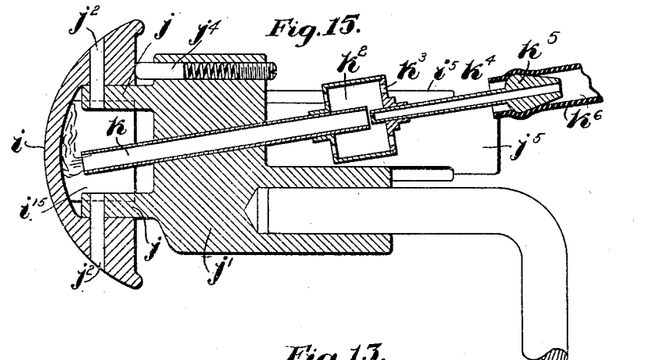
Figure 16:
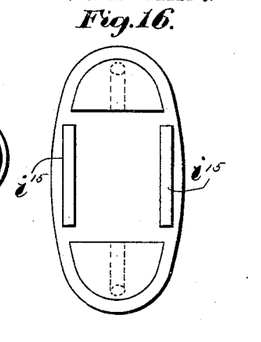
Figure 17:
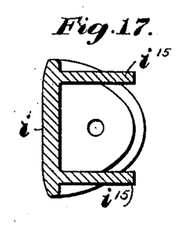
Figure 18:
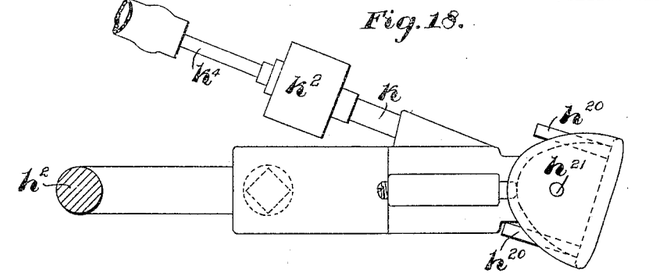
Figs. 18, 19, 20, and 21 illustrate other forms which may be employed.
Figure 19:
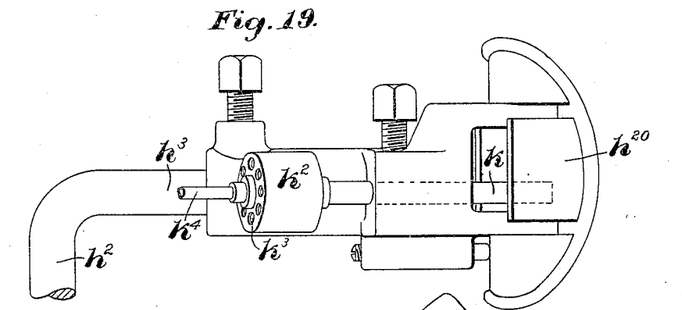
Figure 20:
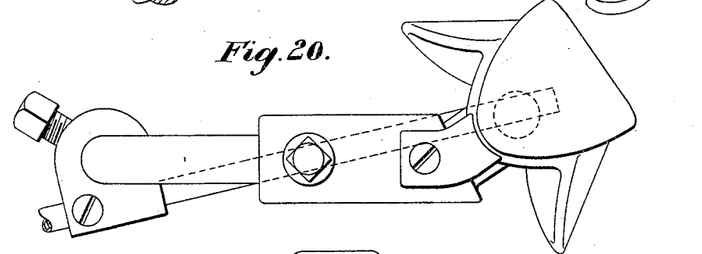
Figure 21:
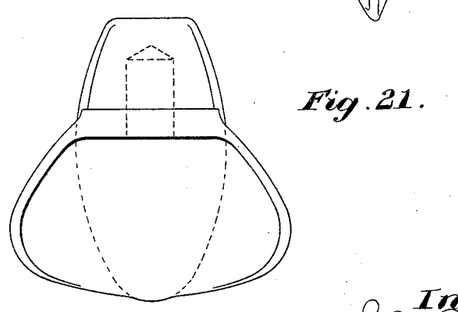

For operating on the sides of the shoe there are provided a plurality of tools. The tools are supported upon levers $h$, fulcrumed upon each side of the block 17 and arranged in notches therein. The lower ends of these levers project below the block and are held evenly apart by springs $h'$. In the upper socketed ends of the levers are the shanks $h^2$ of the tools. These tools may be formed in various ways, as illustrated in Figs. 10 to 12 and 18 to 21. In each case the shank $h^2$ is bent to project inwardly, as at $h^3$. Upon each shank there is secured a support $h^4$, adapted to be secured adjustably to the shank by a set-screw $h^5$. Each tool $h^6$ has an outer operative curved surface $h^7$ and a concave inner surface $h^8$, against which a heating-flame may be directed. In Figs. 10 and 12 the tool is formed with a guide $h^9$ to receive an upright swiveling stud $h^{10}$ on the holder $h^4$. By this means the tool is adapted to swing on a vertical axis, so as to accommodate itself to the continuously-changing contour of the side of the shoe or boot. In Fig. 10 the tool is shown as being held in place by a gib $h^{11}$, taking over a shoulder on the rear side of the tool. In Fig. 12, however, the tool is held in place by a cotter-pin $h^{12}$ and a washer $h^{13}$. It will be observed that in any event the tool is provided with sides or wings $h^{14}$ to form a hollow space or chamber which communicates at its upper end with the atmosphere by an aperture $h^{15}$. The tool may be set at an angle to the bent portion $h^3$ of the shank, as shown in the different figures. The tools are arranged, as shown in Fig. 1, so that they are in a row inclined to the horizontal on each side of the shoe. In order to more effectively iron that portion of the upper which is adjacent to the sole, a shank or rand tool is provided, which is indicated at $i$. Various forms of tools may be employed, as shown in Figs. 5, 6, and 13 to 17. The shank $i'$ for this tool is set in a socket at the upper end of the rod $i^2$, pivoted to a lever $i^3$, so as to swing in a line transverse to the sole of the shoe. The lever $i^3$ is fulcrumed in the block 17, the lower ends of the two opposite levers $i^3$ being held apart by springs. The rod $i^2$ is held at the extreme of its movement to the right in Fig. 1 by springs, whereby a roll $i^5$ on each tool is cast to engage a vertically-curved guide $i^6$ and cast to follow the line of the sole or the rand of the shoe. The roll $i^5$ is shown as journaled in a bracket secured to the bent portion $i^7$ of the shank by a set-screw $i^{81}$. The tool $i$ is fulcrumed upon the vertical stud $i^8$, formed by upwardly bending the extremity of the shank, and is held in place by a gib $i^9$. The tool is formed with the outer curved surface and the concave inner surface and with wings or sides $i^{10}$. The chamber formed in the tool has the duct or aperture $i^{11}$ for the escape of the products of combustion, as will be explained. In Figs. 13 to 17, inclusive, the tool $i$, which may be employed in lieu of that shown in Figs. 5 and 6, is swiveled upon lugs $j\ j$ on a holder $j'$ by upright pintles or studs $j^2$. A spring-pressed pin $j^4$ bears against a flat rear surface of the tool, so as to hold it in neutral position. The tool has the sides or wings $i^{15}$ to form a flame-encircling space and prevent the flame from impinging against the shoe, as in the other tools heretofore described. The roller $i^5$ is journaled in a bracket $j^5$, formed on or secured to the holder $j'$. In all of these tools for operating on the sides of the shoe there is a device by which the tool is heated. In Fig. 15 is shown the burner which is preferably employed. It consists of a nozzle $k$, passed through the tool-support $j'$, as in Figs. 15, 18, and 19, or supported by a separate collar $k'$, affixed to the shank $i'$, as in Figs. 6, 10, and 12. The rear end of the nozzle extends into a mixing-chamber $k^2$, having apertures $k^3$ for the admission of air. Projecting into the mixing-chamber, so as to deliver gas into the nozzle $k$, there is an injector-tube $k^4$, having on its outer end a swelled portion $k^5$, over which the end of the flexible tube or conduit $k^6$ may be expanded. The construction of the burner is such that air and gas mixed in proper quantities are supplied to the nozzle and when ignited burn with a blue flame to heat the tool to the proper temperature for securing the best results in ironing the shoe.

The tubes $k^6$ connect with valves $k^7$, leading from a metallic pipe $k^8$, supported in the standard $g'$ and $g^{10}$. The two pipes $k^8\ k^8$ are respectively connected by flexible tubes $k^9$ with a coupling $k^{10}$ on the supply-pipe $f^2$, as shown in Fig. 4. By this construction gas is supplied for heating all the tools, the flexible connections permitting the reciprocation of the tool-carrier or head $c$. The construction of each tool with the lateral wings and the concave inner surface prevents the flame from coming into contact with the shoe, even though the tools be reciprocated and be swung to the one side or the other as they follow the coutour of the shoe.

The tools which operate upon the toe end of the shoe are yieldingly connected to the support $d'$ in the head $d$. These tools are indicated at $m$, and they may be as many and placed in such arrangement as may be desired, their function being to engage the toe part of the shoe both at the top and on the sides and to effectively rub and iron it. One of the tools is shown in detail in Figs. 7, 8, and 9. It is provided with a convex face $m'$, which forms its lower operative end.

Figures 7, 8:
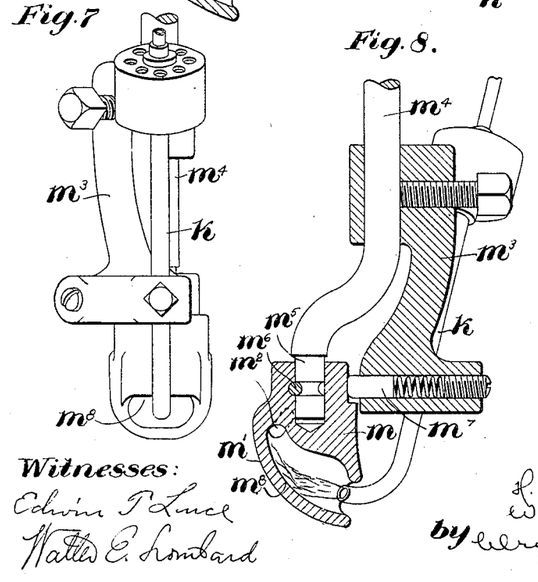
Figs. 7, 8, and 9 represent one form of the tool which is carried by the upper head.
Figure 9:
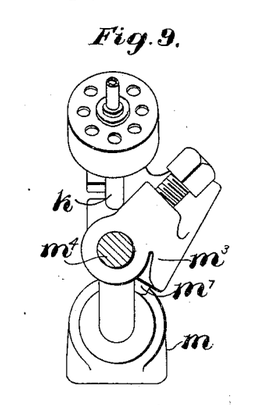

A chamber is formed in the tool, having an escape duct or aperture $m^2$ for the products of combustion resulting from the flame. The nozzle of the burner is indicated at $k$, and it is adjustably secured in a bracket $m^3$, secured to the shank $m^4$ of the tool. On the lower extremity of the shank is a swiveling stud $m^5$, in which the tool is secured so as to rotate by a pin $m^6$, engaging a groove in the stud. A spring-pressed pin $m^7$ bears against the tool, so as to hold it yieldingly in position to permit it to swing to one side or the other. The nozzle of the burner is bent so as to direct the flame into the chamber of the tool and against the concave inner surface thereof. The shanks $m^4$ of the tools are adjustably secured in levers $n$, each fulcrumed at $n'$ and held yieldingly in position by springs $n^2$ and rods $n^3$. When the tools engage the shoe, the levers $n$ swing outwardly against the tension of the springs $n^2$, so as to hold the tools yieldingly against the shoe and to cause them to follow the irregular contour thereof.

Each burner is connected by a flexible pipe $o$ with a valve $o'$, projecting from a pipe $o^2$, mounted in a bracket $o^3$, secured to the sliding head $d$. The pipe $o^2$ is connected by a flexible tube $o^5$ with a large valve $o^6$ on a coupling $o^7$, inserted between the pipe $f^2$ and the main pipe $f$. The valve $f'$ controls the supply of gas to all of the burners. The valve $f^{10}$ controls the supply to the burners on the lower head and the valve $o^6$ to the burners on the upper head. In addition there is a valve, as previously described, for each burner, whereby the size of the various flames for the different tools may be independently regulated.

The operation is apparent from the foregoing description. The valves are opened to admit gas to the various burners, and the mixed air and gas delivered therefrom is ignited. The shoe is placed upon the tree and moved to operative position with relation to the tools, and the machine is set in motion. As the heads reciprocate the tools are adjusted in position, as previously described, with the result that they engage, rub, and iron the upper of the shoe at one point or another until the entire shoe has been completely ironed except on the sole.

By means of this machine the ironing of the shoe is accomplished automatically, and the labor and expense of manually ironing shoes are obviated. The machine itself may be greatly varied in construction without departing from the spirit and scope of the invention, the essence of which consists in provisions whereby the ironing of the shoe is automatically accomplished. In lieu of the medium which is employed for heating the irons or tools any other medium may be provided. For all practical purposes, however, the means shown and described perform satisfactorily the functions for which they are intended.

Having thus explained the nature of the invention and described a way of constructing and using the same, although without attempting to set forth all of the forms in which it may be made or all of the modes of its use, we declare that what we claim is—

1. A machine for automatically ironing the uppers of shoes, comprising a plurality of non-rotatory tools having smooth surfaces adapted to engage and rub the surface of the upper means for holding said tools so that their surfaces conform to the shape of the upper portion of the shoe, automatic means whereby said tools are caused to perform their described functions, and means for applying heat to said tools.

2. A machine for automatically ironing the uppers of shoes, comprising a plurality of non-rotatory tools having smooth surfaces adapted to engage and rub the surface of the upper, means for yieldingly supporting said tools whereby they are adapted to conform to the irregular contour of the shoe, means for heating said tools, and means for automatically reciprocating said tools to cause them to engage and rub the upper.

3. A machine for automatically ironing the uppers of shoes, comprising a plurality of non-rotatory tools each having a smooth operative front portion, a portion to receive a flame directed thereagainst, means for yieldingly supporting said tools, means for directing a jet of flame against the rear portion of each tool means for holding said tools so as to engage practically the entire surface of the shoe-vamp, and provisions for automatically reciprocating said tools whereby they are caused to engage and rub the surface of the upper.

4. A machine for automatically ironing the uppers of shoes, comprising, a plurality of non-rotatable tools each having a surface to engage and rub the upper, and a flame-surface, a shank for each tool, a burner supported by each shank for directing a flame against the flame-surface of the tool thereon, automatic mechanism for reciprocating said tools to cause them to rub the upper, a main gas-conduit, a separate conduit leading to each burner, a valve for the main conduit, and an independent valve for each separate burner.

In testimony whereof we have affixed our signatures in presence of two witnesses.

HARRIE A. BALLARD.
WILLIAM A. COPELAND.

Witnesses:
MARCUS B. MAY,
C. C. STECHER.